Feb. 16, 1943.  A. KRAJNC  2,311,234
CUTTING AND GAUGING INSTRUMENT
Filed April 9, 1942  2 Sheets-Sheet 1

INVENTOR.
BY Anthony Krajnc

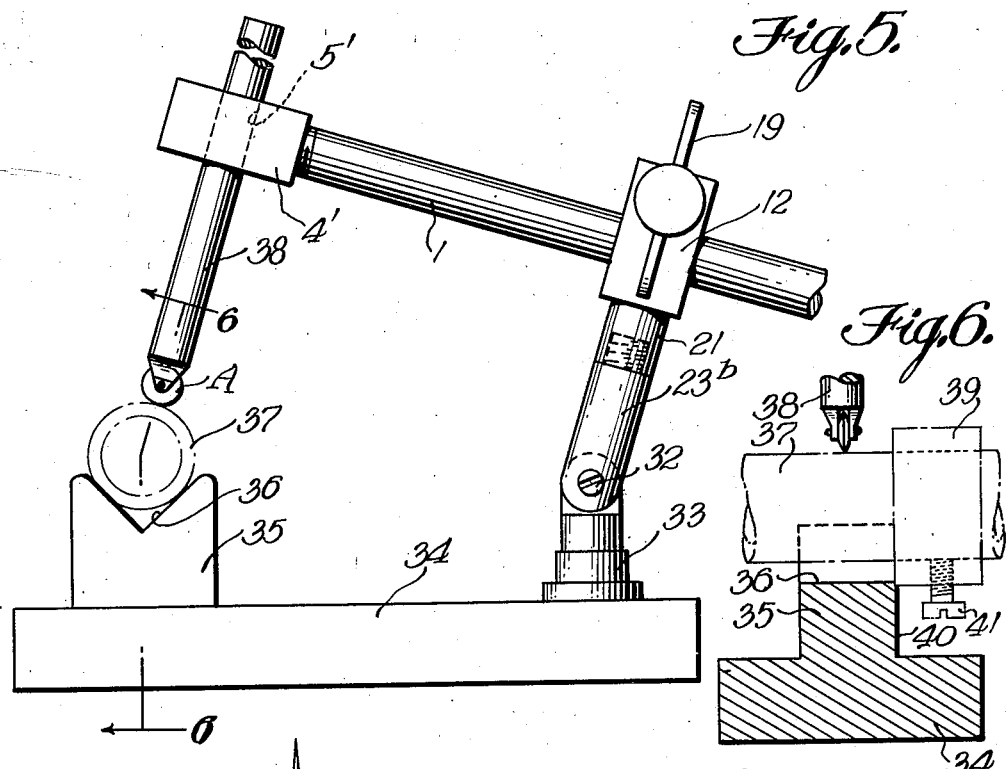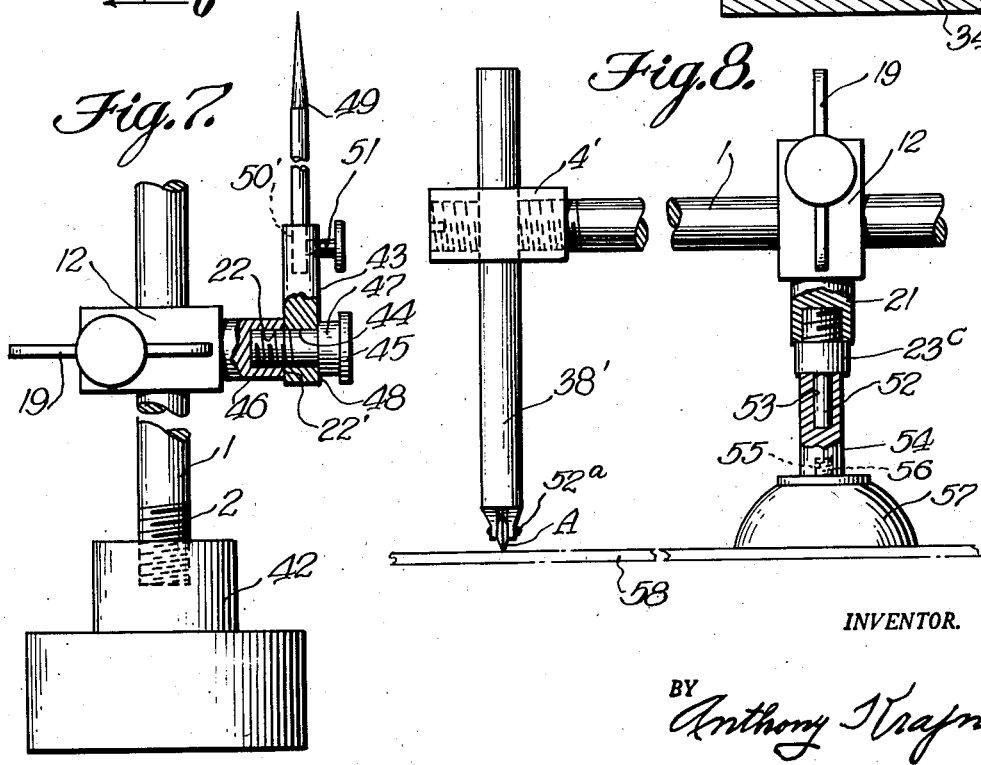

Patented Feb. 16, 1943

2,311,234

UNITED STATES PATENT OFFICE 2,311,234

CUTTING AND GAUGING INSTRUMENT

Anthony Krajnc, Superior, Wis.

Application April 9, 1942, Serial No. 438,247

3 Claims. (Cl. 164—71)

This invention relates to instruments for cutting and gauging, and its principal object is to provide a plurality of main parts to which interchangeable parts may be connected to form various devices.

Another object of the invention is to provide a main beam, an adjustable clamp and coupling to which various fittings may be attached.

Another object is to attach a stem to the clamp and a knife to the coupling whereby to provide a novel gasket cutter.

Other interchangeable fittings may include a glass tube cutter, plate glass cutter, caliper jaws for inside or outside measurements, tram and surface gauge connections.

With these and other objects in view the invention will be better understood by referring to the following specification and accompanying drawings wherein like numerals represent corresponding parts and Fig. 1 is an elevational view of a gasket cutter with parts broken away and shown in section.

Fig. 5 is an elevational view of a modified form depicting a gauge glass cutter.

Fig. 6 is an elevational view of a transverse section taken on the line 6—6 of Fig. 5.

Fig. 7 is an elevational view of a modified form depicting a surface gauge with parts broken away and shown in section, and Fig. 8 is an elevational view of a plate glass cutter with parts broken away and shown in section.

Figure 1:
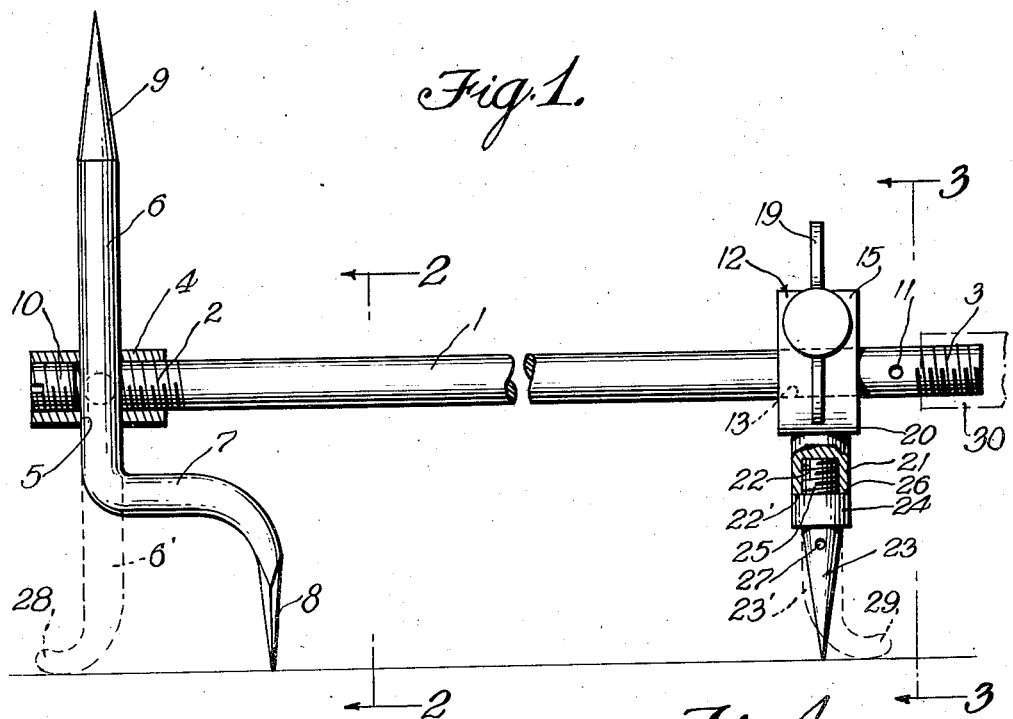
Figure 2:
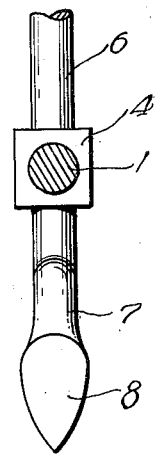
Fig. 2 is a transverse section taken on the line 2—2 of Fig. 1.
Figure 3:
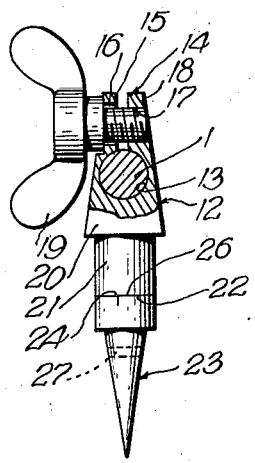
Fig. 3 is a transverse section taken on the line 3—3 of Fig. 1.

Referring more particularly to Figs. 1, 2, and 3, 1 indicates a beam of round rod formation having threaded ends 2 and 3. Threaded on the end 2 is a coupling 4 having a transverse opening 5. Mounted in the opening 5 is a shaft 6 having an inwardly extending offset portion 7 formed into a knife edge 8 at its lower end. The upper end of the shaft 6 is formed in a point 9. A screw 10 is threaded longitudinally in the outer end of coupling 4 and is adapted to lock the shaft 6 in position. A transverse opening in the beam 1 is shown at 11 in which a suitable tightening rod (not shown) may be inserted.

A clamp 12 is provided with an opening 13 adapted to receive the beam 1. The clamp 12 is provided with a split portion 14. One section 15 of the split portion 14 has a transverse opening 16 which aligns with a threaded opening 17 in the other section 18 of the portion 14. A clamping screw 19 is mounted in the openings 16 and 17 whereby to lock the clamp 12 in adjusted position.

Projecting downwardly from the lower end 20 of the clamp 12 is an extension 21 having a longitudinal threaded opening 22 at its base 22'. A centering pin 23 is provided with a shoulder 24 having a reduced threaded extension 25 mounted in the opening 22 with upper face 26 of shoulder 24 in abutment with the base 22'. A transverse opening 27 in the pin 23 is adapted to receive a tightening rod (not shown) for locking the pin 23 in position.

The above description pertains to a gasket cutter. With this construction, the clamp 12 may be moved longitudinally to the desired distance from the cutting edge 8 and locked in position by the screw 19.

In operation the pin 23 is pressed in position on material to be cut and the outer circumference of the gasket cut by either scribing a circle with the knife 8 or pressing both the knife and pin into position and drawing the material around the center. The operation is then repeated for cutting the inner circumference of the gasket.

The offset portion 7 provides for bringing the knife edge 8 in closer position to the pin 23 whereby small diameters may be cut.

The device may be modified simply by substituting other units in the openings 5 and 22. As shown in dotted lines a shaft 6' is provided at its lower end with an outwardly extending nose 28. The pin 23', shown in dotted lines is provided at its lower end with an outwardly extending nose 29. With this arrangement the device is utilized for outside calipers. The noses 28 and 29 may be turned inwardly to provide for inside calipers.

To provide dividers the shaft 6 may be reversed in the opening 5 with the point 9 at the base. A second coupling 30 and extension rod (not shown) may be attached to the end 3.

Figure 4:
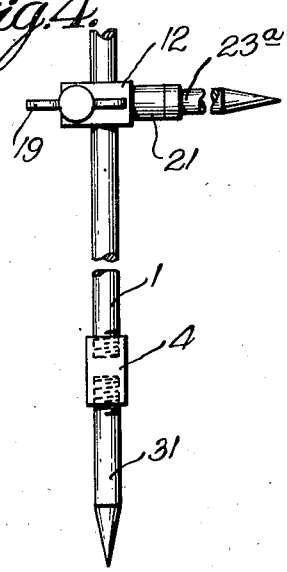
Fig. 4 is an elevational view of a modified form depicting a tram.

In Fig. 4 is shown a modified form of the device wherein the beam 1 is arranged in upright position, with the clamp 12 and pin 23a arranged transversely thereon. Threaded in the outer end of the coupling 4 is a second pin 31.

With this arrangement an adjustable tram is provided.

Referring now to Figs. 5 and 6, a pin 23b is connected at its lower end in pivotal connection as at 32 to the upper end of a standard 33 fixed to a base plate 34. Fixed at the other end of the standard 34 is a block 35 having a V shaped upper end 36. The end 36 is adapted to receive a length of gauge glass tubing 37. Mounted in the opening 5' of the coupling 4' is a glass cutter 38 with the roller A arranged transversely with respect to the tube 37. A sleeve 39 is mounted on the tube 37 locked in position by a set screw 41. With this arrangement a tube cutter is provided. In operation the cutter 38 is pressed against the tube 37 which is revolved manually with the sleeve 39 in abutment with the edge 40 of the block 35.

In Fig. 7 is shown a further form of the device wherein the beam 1 is arranged in upright position. A stand 42 receives the end 2. Mounted in abutment with the base 22' is a connector 43 having an opening 44 in which is arranged a pin 45 having a threaded end 46 mounted in the opening 22. The pin 45 is provided with a shoulder 47 adapted to abut the face 48 of the connector 43. A pin 49 is arranged in a longitudinal opening 50 and locked in position by a set screw 51. With this arrangement a surface gauge is provided.

A further modification of the invention is shown in Fig. 8 wherein a plate glass cutter is provided.

In this form the cutter 38' is arranged in the coupling 4' with the pivot pin 52a of the roller A in axial alignment with the beam 1.

A pin 23c is provided at its lower end with a swivel 52 mounted in an opening 53 of a rod 54. The rod 54 is threaded at its lower end as at 55 to receive a threaded pin 56 mounted in a suction cup 57. The suction cup 57 serves to provide a fixed center on a sheet of glass 58 and the cutter 38' revolves in a circle about this center.

From the foregoing it will be seen that I have provided a simple and efficient device which is economical in manufacture, and it is to be understood that various changes may be made in the details of construction without departing from the spirit of the invention.

Having thus described my invention what I claim is:

1. A device of the class described, including in combination, a base, a V shaped block mounted at one end of said base, a standard mounted at the other end of said base, a clamp, a pin forming pivotal connection between said standard and said clamp, a horizontal rod adjustably mounted in said clamp, a coupling mounted on one end of said rod, a cutting unit mounted transversely in said coupling, a tube adapted to be rotated in said block, a collar carried by said tube in abutment with one end of said block, and a cutting roller mounted transversely with respect to said tube at the lower end of said unit adapted to be pressed against said tube when rotated.

2. A device of the class described, including in combination, a base, a block mounted at one end of said base having a transverse V shaped slot in its upper face, a standard, a clamp, a pin fixed to the lower end of said clamp having pivotal connection with said standard, a rod adjustably mounted longitudinally of said base in said clamp, a coupling connected to one end of said rod, a cutting unit adjustably mounted vertically in said coupling, a tube rotatable in said slot, a collar adjustably carried on said tube adapted to abut one end of said block, and a cutting roller mounted transversely of said tube at the lower end of said unit adapted to be pressed against said tube.

3. A device of the class described, including in combination, a rod having both ends threaded with the same kind of threads, a coupling screw threaded internally at both ends to fit the threads on said rod, said coupling having a transverse aperture to receive varying tools, a securing screw plug for said tools having threads to fit said internal threads, a clamp adapted to be adjusted to various positions on said rod, and means for locking said clamp in various positions, said clamp having a screw threaded aperture in the base thereof to be engaged by the threads on the shanks of various instrumentalities, added thereto alternately to effect a center point cutter, a caliper, a tube cutter having a base, a base cutter to cut planar material, a point caliper and a base caliper.

ANTHONY KRAJNC.